(12) United States Patent
Yan

(10) Patent No.: US 10,458,402 B2
(45) Date of Patent: Oct. 29, 2019

(54) MICRO WATER PUMP CAPABLE OF CONTROLLING FLOW PRECISELY

(71) Applicant: Xiamen Conjoin Electronics Technology Co., Ltd., Xiamen (CN)

(72) Inventor: Hong Yan, Xiamen (CN)

(73) Assignee: XIAMEN CONJOIN ELECTRONICS TECHNOLOGY CO., LTD., Xiamen, Fujian (CN)

( * ) Notice: Subject to any disclaimer, the term of this patent is extended or adjusted under 35 U.S.C. 154(b) by 436 days.

(21) Appl. No.: 15/218,091

(22) Filed: Jul. 25, 2016

(65) Prior Publication Data
US 2018/0023556 A1    Jan. 25, 2018

(51) Int. Cl.
*F04B 43/02* (2006.01)
*F04B 9/04* (2006.01)
(Continued)

(52) U.S. Cl.
CPC ............ *F04B 43/026* (2013.01); *F04B 9/045* (2013.01); *F04B 17/03* (2013.01); *F04B 49/065* (2013.01);
(Continued)

(58) Field of Classification Search
CPC .... F04B 53/106; F04B 53/1065; F04B 9/045; F04B 43/043; F04B 43/04; F04B 43/021; F04B 43/02; F04B 53/1047; F04B 53/1087; F04B 45/043; F04B 45/047; F04B 43/0045; F04B 43/0081; F04B 19/006; F04B 43/025; F04B 43/026; F04B 43/00;
(Continued)

(56) References Cited

U.S. PATENT DOCUMENTS 4,610,605 A * 9/1986 Hartley ............... F04B 43/0054
                                                        417/269
4,925,371 A * 5/1990 Griesmar ............... F04B 13/00
                                                        417/18
(Continued)

FOREIGN PATENT DOCUMENTS

CN          2546650 Y    4/2003
CN        201062575 Y    5/2008
(Continued)

OTHER PUBLICATIONS

First Office Action with Search Report dated Aug. 17, 2017 issued in corresponding Chinese Patent Application No. 201610460508.9 (with English translation).

(Continued)

*Primary Examiner* — Bryan M Lettman
(74) *Attorney, Agent, or Firm* — Scully Scott Murphy & Presser, P.C.

(57) ABSTRACT

A micro water pump capable of controlling flow precisely includes an upper cover, a valve seat, a water capsule seat, a base casing, a water capsule, a crank lever, a drive shaft, an eccentric wheel, a motor, a photoelectric switch, and an output circuit board. The output circuit board is electrically connected with an external motor controller. Through the photoelectric switch to detect the revolution of the motor and to cooperate with the external motor controller, the revolution of the motor control can be controlled precisely so as to get a stable water flow under different volumes and back pressures.

9 Claims, 11 Drawing Sheets

(51) Int. Cl.
*F04B 53/10* (2006.01)
*F04B 17/03* (2006.01)
*F16K 15/14* (2006.01)
*F04B 49/06* (2006.01)

(52) U.S. Cl.
CPC ...... *F04B 53/1047* (2013.01); *F04B 53/1087* (2013.01); *F16K 15/148* (2013.01); *F04B 2201/1208* (2013.01); *Y10T 137/7863* (2015.04)

(58) Field of Classification Search
CPC ...... F04B 2201/1208; F16K 7/17; F16K 7/14; F16K 15/148; Y10T 137/7862–7865
See application file for complete search history.

(56) References Cited

U.S. PATENT DOCUMENTS

| | | | |
|---|---|---|---|
| 5,173,033 A | 12/1992 | Adahan | |
| 6,206,664 B1* | 3/2001 | Kakizawa | F04B 43/026 417/569 |
| 2013/0034452 A1* | 2/2013 | Itahara | F04B 43/02 417/321 |
| 2014/0154117 A1* | 6/2014 | Fukami | F04B 43/026 417/413.1 |
| 2014/0161654 A1* | 6/2014 | Dorfler | F04B 43/0045 417/443 |
| 2015/0316045 A1* | 11/2015 | Dankbaar | F04B 1/14 417/53 |
| 2016/0040664 A1* | 2/2016 | Zhang | F04B 39/1073 417/473 |
| 2016/0047365 A1* | 2/2016 | Douglas | F04B 43/04 417/222.1 |

FOREIGN PATENT DOCUMENTS

| | | |
|---|---|---|
| CN | 201747572 U | 2/2011 |
| CN | 102536756 A | 7/2012 |
| CN | 202690357 U | 1/2013 |
| CN | 202883327 U | 4/2013 |
| CN | 202883328 U | 4/2013 |
| CN | 203590544 U | 5/2014 |
| CN | 204493148 U | 7/2015 |
| CN | 204610208 U | 9/2015 |
| CN | 105179214 A | 12/2015 |
| CN | 103452806 B | 2/2016 |
| CN | 206129566 U | 4/2017 |
| JP | 2013-163975 | 8/2013 |
| JP | 2014-13007 | 1/2014 |
| WO | WO2015058728 * | 4/2015 |

OTHER PUBLICATIONS

Second Office Action with Search Report dated Jul. 2, 2018 issued in corresponding Chinese Patent Application No. 20161460508.9 (with English translation).

* cited by examiner

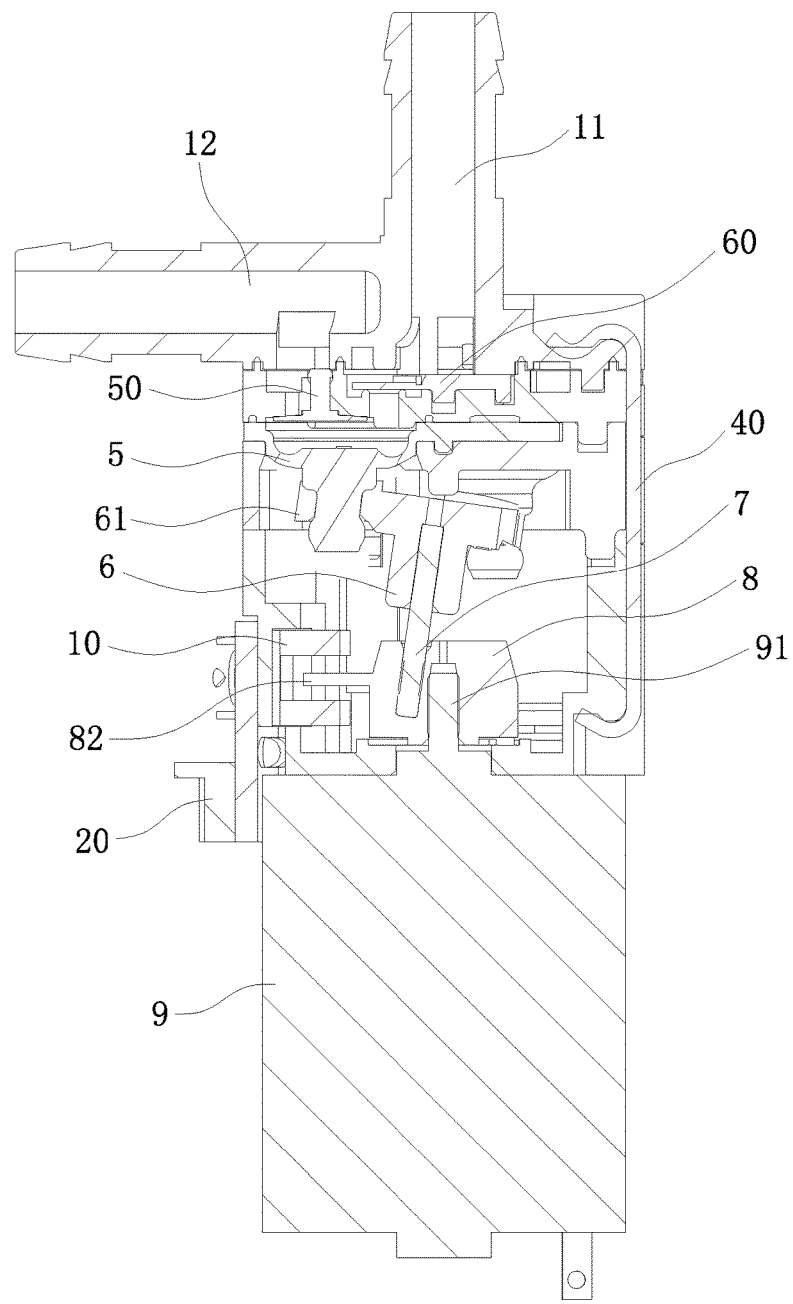
F I G. 4

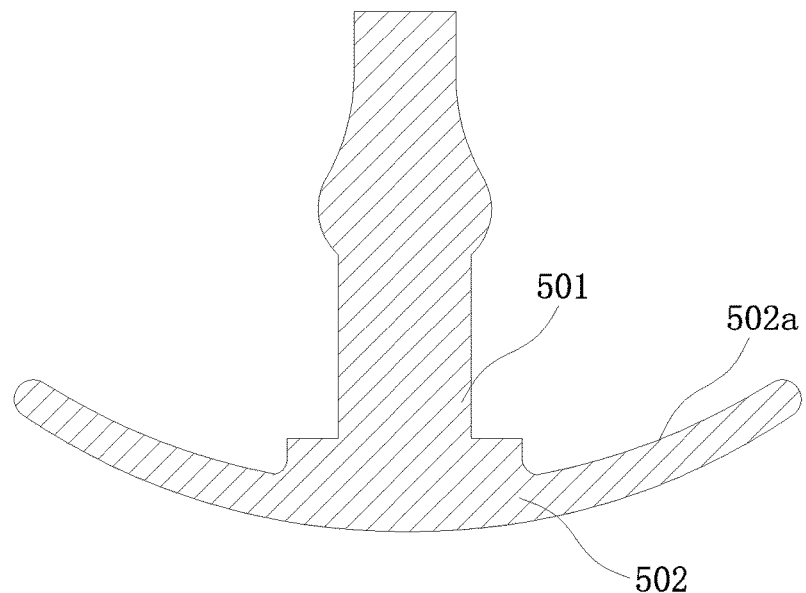
F I G. 12
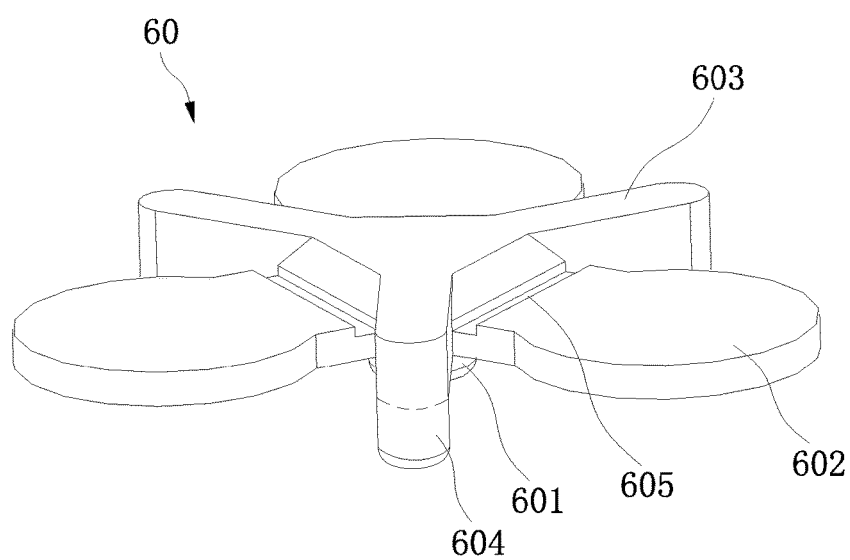
F I G. 13

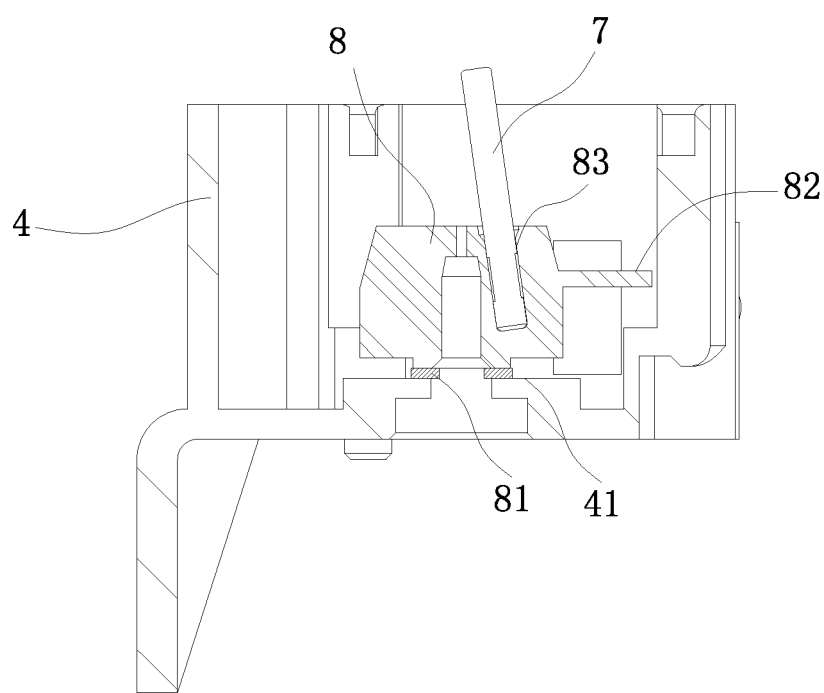
F I G. 14

MICRO WATER PUMP CAPABLE OF CONTROLLING FLOW PRECISELY

BACKGROUND OF THE INVENTION

1. Field of the Invention

The present invention relates to a micro water pump, and more particularly to a micro water pump capable of controlling flow precisely.

2. Description of the Prior Art

A diaphragm-type micro water pump comprises a motor to provide circular motions. A diaphragm inside the water pump is reciprocated through a mechanical device to compress or expand the air inside the pump. There are many types of diaphragms on the market. Under the action of a one-way valve, a pressure difference is generated between the water outlet/water inlet and the external atmosphere. Under the action of the pressure difference, the water enters the water inlet and then drains from the water outlet. This micro water pump has been used in small appliances, medical equipment, and the like. However, the existing micro water pump is difficult to achieve an accurate regulation of flow. Accordingly, the inventor of the present invention has devoted himself based on his many years of practical experiences to solve these problems.

SUMMARY OF THE INVENTION

The primary object of the present invention is to provide a micro water pump capable of controlling flow precisely. The running of the micro water pump is stable and smooth, and the micro water pump has a long service life.

In order to achieve the aforesaid object, the micro water pump capable of controlling flow precisely of the present invention comprises an upper cover, a valve seat, a water capsule seat, a base casing, a water capsule, a crank lever, a drive shaft, an eccentric wheel, a motor, a photoelectric switch, and an output circuit board.

The motor and the photoelectric switch are installed on the base casing. The motor comprises a motor shaft. The motor shaft is inserted into the base casing and directly connected with the eccentric wheel in the base casing. The motor shaft and the eccentric wheel constitute a transmission member. The transmission member is radially provided with a photoelectric shelter corresponding to the photoelectric switch. The photoelectric shelter cooperates with the photoelectric switch for detecting a revolution of the motor. The photoelectric switch is electrically connected with the output circuit board. The output circuit board is electrically connected with an external motor controller and transmits information of the revolution of the motor to the exterior motor controller;

The eccentric wheel is formed with an oblique eccentric hole. One end of the drive shaft is obliquely inserted in the eccentric hole. Another end of the eccentric wheel is connected with the crank lever. An upper end of the crank lever is provided with at least two supports extending outward. The crank lever swings to bring the supports to compress and swing repeatedly.

The water capsule seat is sealedly installed on the base casing. The water capsule seat is formed with at least two installation holes corresponding to the supports. Each installation hole is sealedly installed with the water capsule. An upper portion of the water capsule is open. A lower portion of the water capsule is installed on a corresponding one of the supports. The supports bring the water capsule to compress and swing repeatedly.

The valve seat is sealedly installed on the water capsule seat. The valve seat is formed with an inlet hole and an outlet hole corresponding to the water capsule. The inlet hole and the outlet hole are provided with one-way valves which are opened in different directions.

The upper cover is sealedly installed on the valve seat. The upper cover is formed with a water outlet and a water inlet. The water inlet communicates with the inlet hole. The water outlet communicates with the outlet hole.

Accordingly, the running of the micro water pump of the present invention is stable and smooth, and the micro water pump has a long service life. Through the photoelectric switch to detect the revolution of the motor, the output circuit board transmits information of the revolution of the motor to the exterior motor controller. The exterior motor controller can control the revolution of the motor precisely so as to get a stable water flow under different volumes and back pressures. For the micro water pump that is small in size, the eccentric wheel is directly connected with the motor, without additional transmission members.

BRIEF DESCRIPTION OF THE DRAWINGS

FIG. 4 is a sectional view according to the preferred embodiment of the present invention;

FIG. 12 is a sectional view showing another form of the umbrella-shaped valve according to the preferred embodiment of the present invention;

FIG. 13 is a perspective view showing the diaphragm unit according to the preferred embodiment of the present invention;

FIG. 14 is a schematic view showing the base casing in another configuration according to the preferred embodiment of the present invention.

DETAILED DESCRIPTION OF THE PREFERRED EMBODIMENTS

Figure 1:
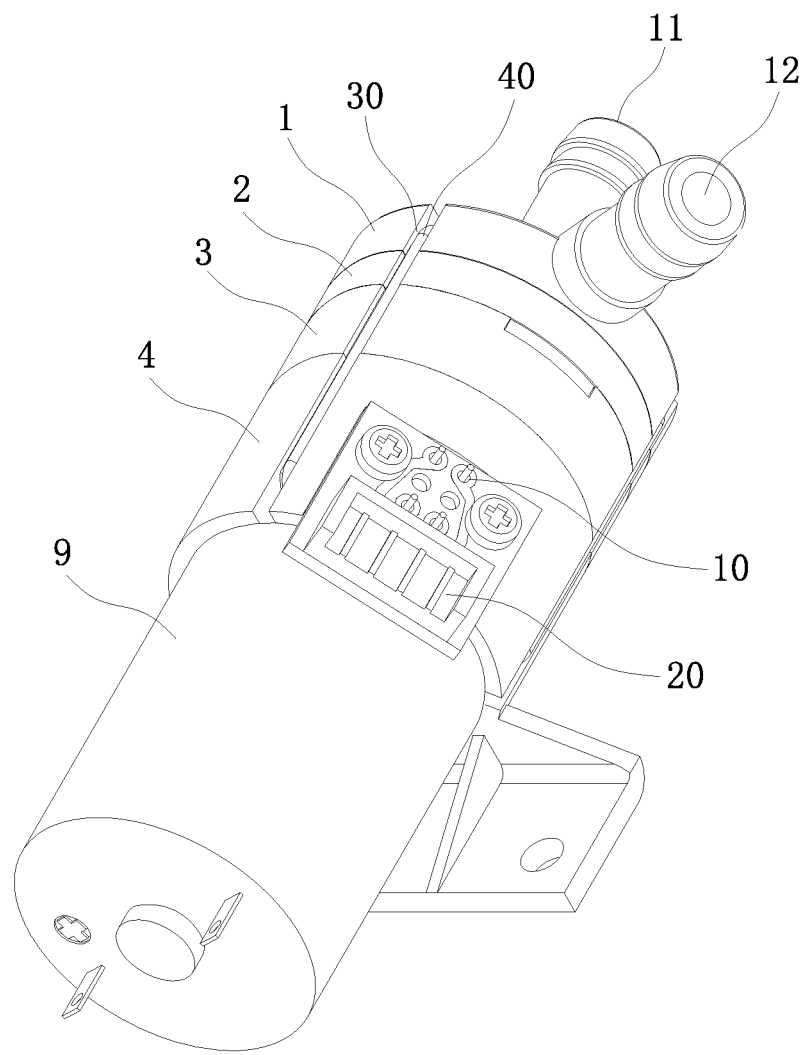
FIG. 1 is a perspective view according to a preferred embodiment of the present invention.

Embodiments of the present invention will now be described, by way of example only, with reference to the accompanying drawings.

As shown in FIG. 1 to FIG. 4, the present invention discloses a micro water pump capable of controlling flow precisely. The micro water pump comprises an upper cover 1, a valve seat 2, a water capsule seat 3, a base casing 4, a water capsule 5, a crank lever 6, a drive shaft 7, an eccentric wheel 8, a motor 9, a photoelectric switch 10, and an output circuit board 20.

The upper cover 1, the valve seat 2, the water capsule seat 3, and the base casing 4 are sealedly mounted in order from top to bottom and each formed with grooves 30 on respective outer walls thereof to receive engaging springs 40. Upper and lower ends of the engaging springs 40 are pressed against the upper cover 1 and the base casing 4, respectively, such that the upper cover 1, the valve seat 2, the water capsule seat 3, and the base casing 4 are secured together.

The motor 9 and the photoelectric switch 10 are installed on the base casing 4. The motor 9 comprises a motor shaft 91. The motor shaft 91 is inserted into the base casing 4 and directly connected with the eccentric wheel 8 in the base casing 4.

When the operating back pressure of the pump is larger, the wear and tear between the eccentric wheel 8 and the base casing 4 will increase rapidly to influence the water flow. For this reason, as shown in FIG. 14, a wear plate 81 is provided and mounted between the eccentric wheel 8 and the base casing 4. The base casing 4 is formed with a raised platform 41. The wear plate 81 is installed on the raised platform 41, preventing friction between the eccentric wheel 8 and the base casing 4 to result in wear and tear.

A transmission member composed of the motor shaft and the eccentric wheel 8 is radially provided with a photoelectric shelter 82 corresponding to the photoelectric switch 10. The photoelectric shelter 82 may be formed on the motor shaft of the transmission member. The motor shaft may be an exposed shaft, a rear output shaft or a transmission shaft of the motor. In a preferred embodiment, the eccentric wheel 8 is directly radially formed with the photoelectric shelter 82. The photoelectric switch 10 is electrically connected with the output circuit board 20. The photoelectric shelter 82 cooperates with the photoelectric switch 10 for detecting the revolution of the motor 9. The output circuit board 20 is electrically connected with an external motor controller, such that external motor controller controls the revolution of the motor precisely so as to get stable water flow under different volumes and back pressures. For example, the external motor controller makes a comparison between the detected revolutions with the preset revolution. When the detected revolution and the preset revolution are identical, the external motor controller controls the motor 9 to stop running. In this state, the flow sent by the pump is the required flow. The control is precise. When it is necessary to change the water flow, the operator just changes the preset revolution.

Figure 5:
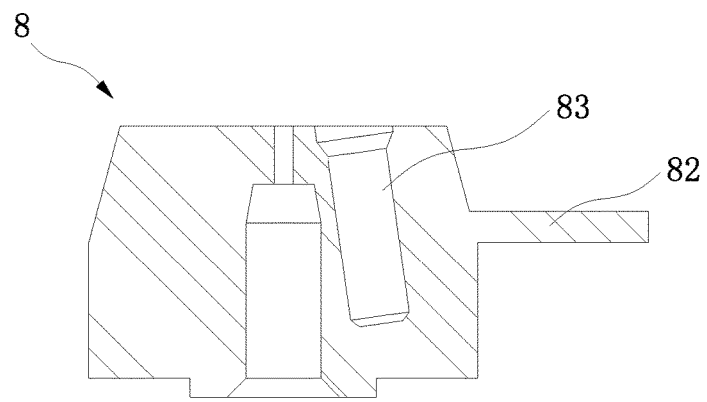
FIG. 5 is a sectional view showing the eccentric wheel according to the preferred embodiment of the present invention.

Referring to FIG. 5, the eccentric wheel 8 is formed with an oblique eccentric hole 83. One end of the drive shaft 7 is obliquely inserted in the eccentric hole 83. As shown in FIG. 4, another end of the eccentric wheel 8 is connected with the crank lever 6. The eccentric wheel 8 brings the drive shaft 7 to turn circularly. Because the drive shaft 7 is obliquely disposed, it can bring the crank lever 6 to swing. An upper end of the crank lever 6 is provided with at least two supports 61 extending outward. In this embodiment, the crank lever 6 is provided with three supports 61. The crank lever 6 swings to bring the supports 61 to compress and swing repeatedly.

Figure 2:
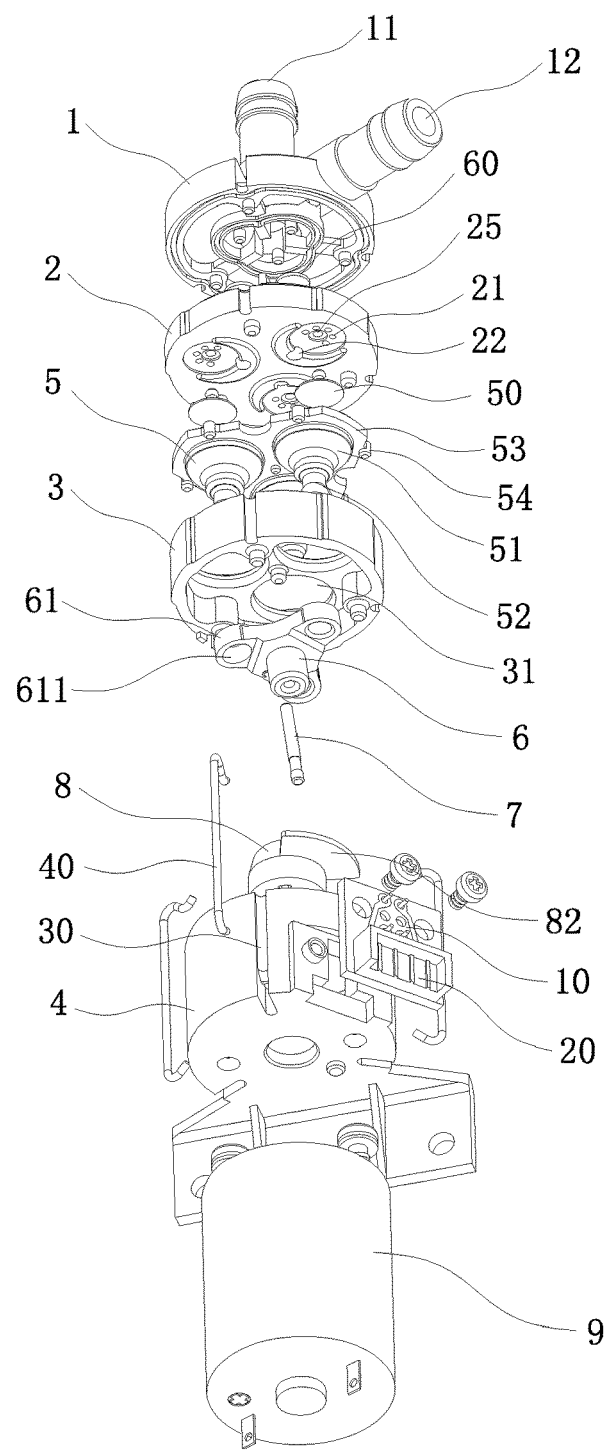
FIG. 2 is a first exploded view according to the preferred embodiment of the present invention.
Figure 3:
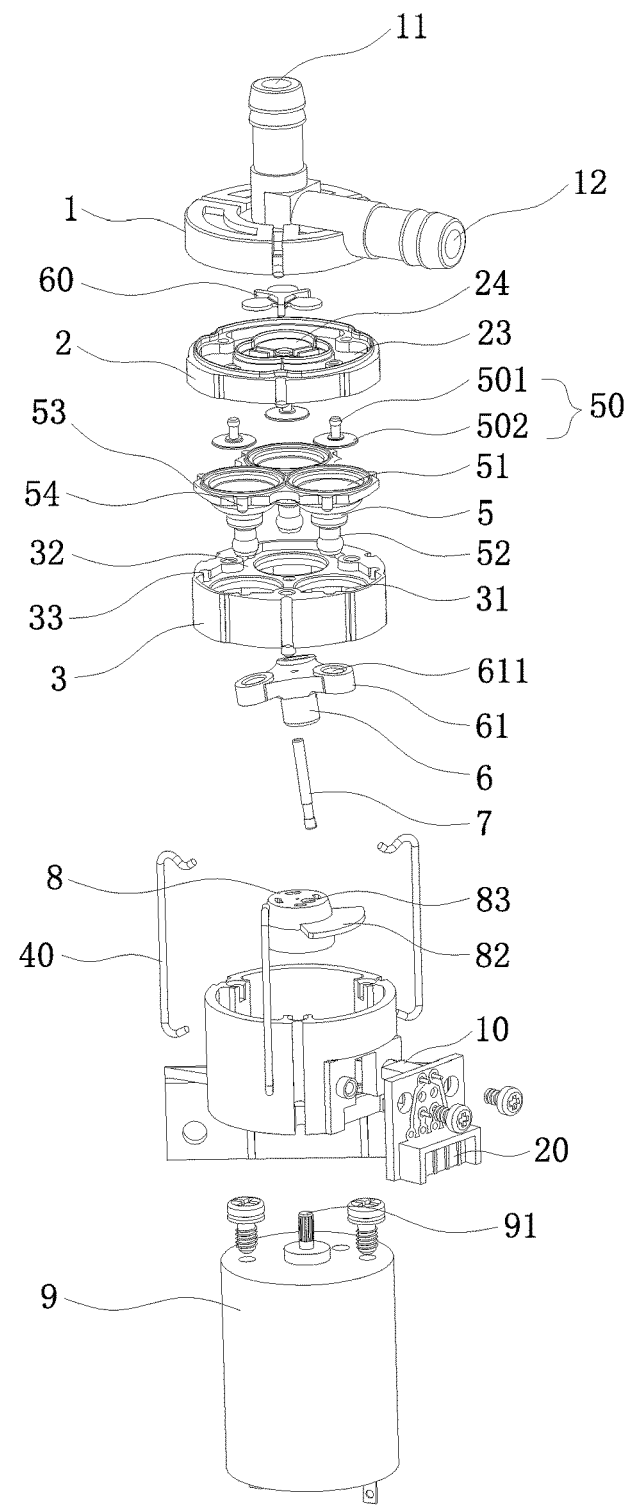
FIG. 3 is a second exploded view according to the preferred embodiment of the present invention.
Figure 6:
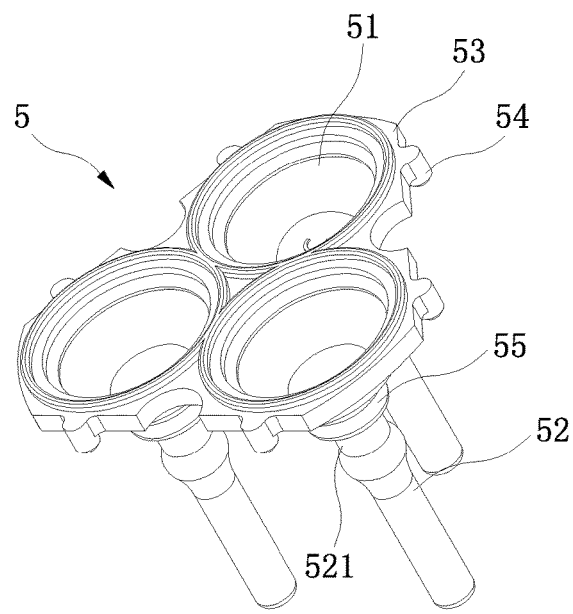
FIG. 6 is a perspective view showing the water capsule according to the preferred embodiment of the present invention.
Figure 7:
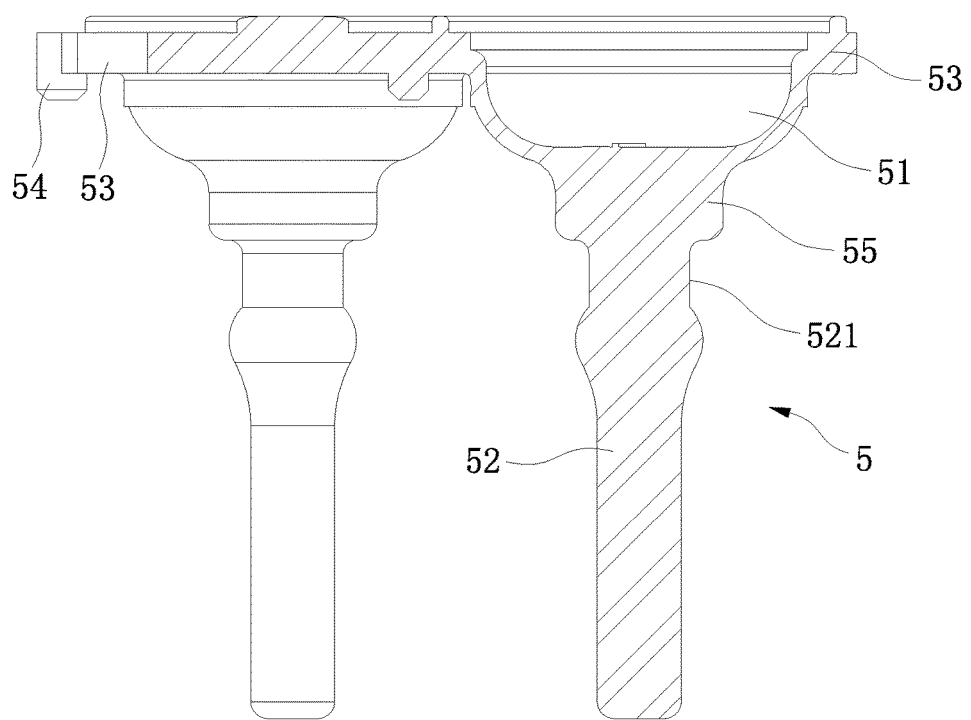
FIG. 7 is a sectional view showing the water capsule according to the preferred embodiment of the present invention.

The water capsule seat 3 is sealedly installed on the base casing 4. As shown in FIG. 2 and FIG. 3, the water capsule seat 3 is formed with at least two installation holes 31 corresponding to the supports 61. In this embodiment, the water capsule seat 3 is formed with three installation holes 31. Each installation hole 31 is sealedly installed with the water capsule 5. An upper portion of the water capsule 5 is open. A lower portion of the water capsule 5 is installed on a corresponding one of the supports 61. As shown in FIG. 6 and FIG. 7, the water capsule 5 includes a capsule body 51 at the upper portion thereof and an installation post 52 at the lower portion thereof. The capsule body 51 has an open upper end and has a bowl shape. The upper end of the capsule body 51 is formed with an installation face 53 around the capsule body 51. The installation face 53 has a thickness greater than that of a bowl wall 511 of the capsule body 51. An outer side of the installation face 53 is formed with positioning protrusions 54. The water capsule seat 3 is formed with a trough face 32 at the installation holes 31 and positioning notches 33 around the trough face 32. The positioning protrusions 54 are engaged in the positioning notches 33. The installation face 53 is sealedly disposed on the trough face 53 through the valve seat 2. Through this configuration, the capsule body 51 is fixed on the water capsule seat 3 stably, preventing the upper portion of the water capsule seat 3 from be deformed to influence the precision of the flow.

The installation post 52 is formed with a neck 521. The support 61 is formed with a post hole 611. The neck 521 is inserted into the post hole 611 so as to assemble the installation post 52 on the support 61. The support 61 brings the water capsule 5 to compress and swing repeatedly so as to suck water and drain water. The junction of the capsule body 51 and the installation post 52 is formed with a compression portion 55 having a diameter greater than that of the installation post 52. The compression portion 55 possesses high strength to bear the stress, which can prevent the junction from being deformed to influence the compression breadth of the capsule body 51, such that the flow can be controlled precisely.

Figure 8:
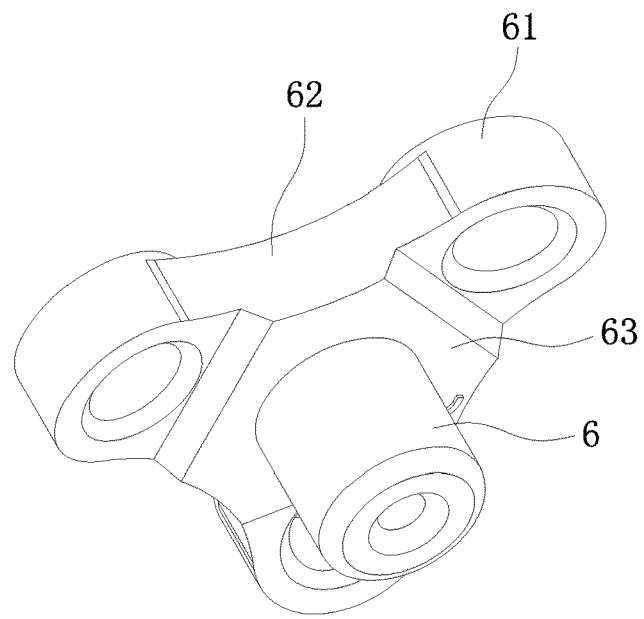
FIG. 8 is a perspective view showing the crank lever according to the preferred embodiment of the present invention.
Figure 9:
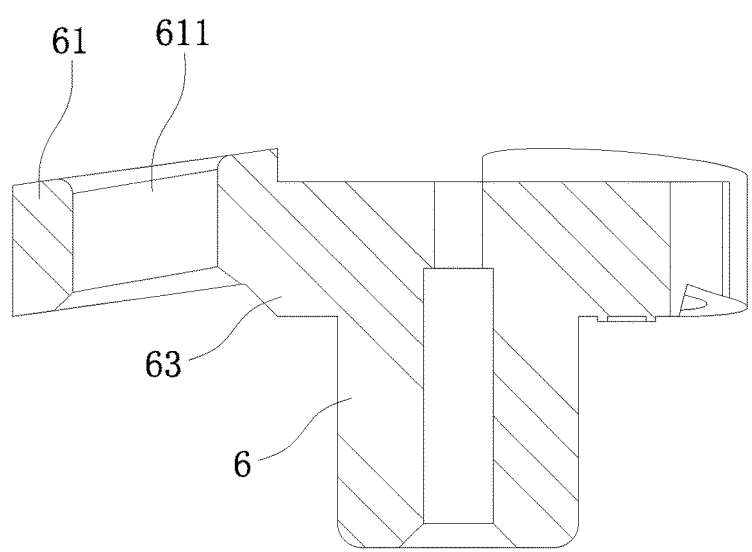
FIG. 9 is a sectional view showing the crank lever according to the preferred embodiment of the present invention.

As shown in FIG. 8 and FIG. 9, the crank lever 6 has a flat transition section 62 between the supports 61 and a reinforcement area 63 at the junction of the supports 61 and the upper end of the crank lever 6. The thickness of the reinforcement area 63 is increased. Through the flat transition section 62 and the reinforcement area 63, the crank lever 6 has enough strength to prevent deformation so as to control the flow precisely. The support 61 and the crank lever 6 are arranged at an acute angle. Because the support 61 swings up and down, the arrangement of the acute angle can decrease a transverse acting force from the support 61 to the installation post 52, such that the deformation of the installation post 52 can be lowered to ensure the compression breadth of the capsule body 51 and to control the flow precisely.

Figure 15:
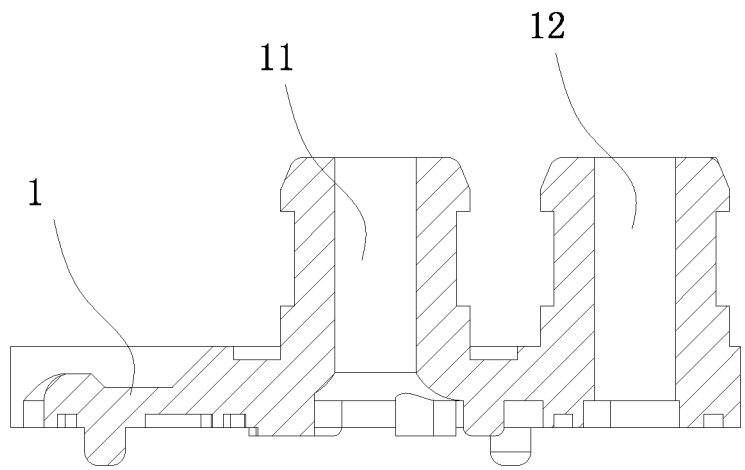
FIG. 15 and FIG. 16 are sectional views showing the water outlet and the water inlet of the upper cover in different configurations according to the preferred embodiment of the present invention.
Figure 16:
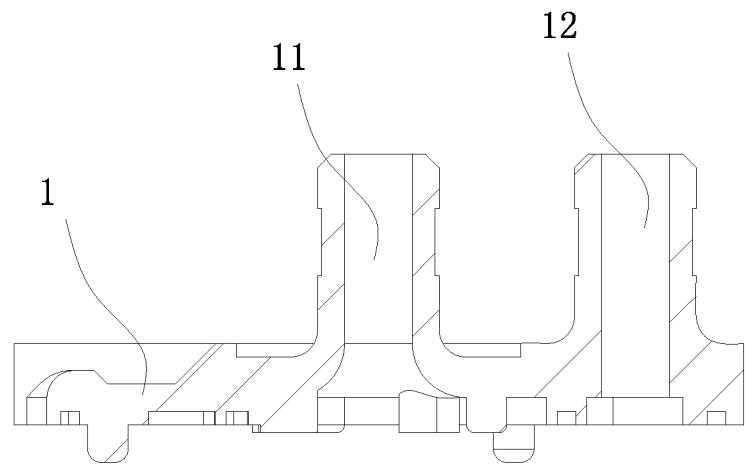

The valve seat 2 is sealedly installed on the water capsule seat 3. As shown in FIG. 2, the valve seat 2 is formed with an inlet hole 21 and an outlet hole 22 corresponding to each water capsule 5. The inlet hole 21 and the outlet hole 22 are provided with one-way valves which are opened in different directions. The upper cover 1 is sealedly installed on the valve seat 2. The upper cover 1 is formed with a water outlet 11 and a water inlet 12. The water inlet 12 communicates with the inlet hole 21. The water outlet 11 communicates with the outlet hole 22. FIG. 4 and FIG. 15 show the arrangement of three different types of the water outlet 11 and the water inlet 12. FIG. 15 and FIG. 16 show the water outlet 11 and the water inlet 12 may be different in size.

Figure 10:
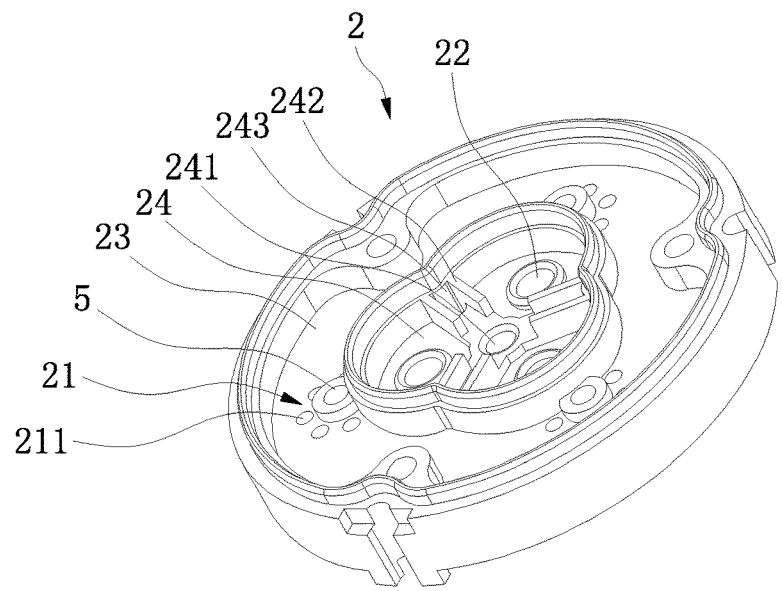
FIG. 10 is a perspective view showing the valve seat according to the preferred embodiment of the present invention.

As shown in FIG. 3 and FIG. 10, an upper surface of the valve seat 2 is formed with an outer annular inlet passage 23 and an inner annular outlet passage 24. The outer annular inlet passage 23 and the inner annular outlet passage 24 are separated from each other and disposed at outer and inner sides of the upper surface of valve seat 2. The inlet hole 21 is disposed in the outer annular inlet passage 23. The outlet hole 22 is disposed in the inner annular outlet passage 24.

The one-way valve used for the inlet hole 21 of the outer annular inlet passage 23 is an umbrella-shaped valve 50. The one-way valve used for the outlet hole 22 of the inner annular outlet passage 24 is in another type (described below). The one-way valve used for the outlet hole 22 can be the umbrella-shaped valve 50.

As shown in FIG. 3, FIG. 4, FIG. 11 and FIG. 12, the umbrella-shaped valve 50 includes an umbrella stick 501 and a reverse umbrella face 502. The valve seat 2 is formed with an umbrella stick installation hole 25. The umbrella stick 501 is inserted and installed in the umbrella stick installation hole 25. As shown in FIG. 2 and FIG. 10, the inlet hole 21 is composed of a plurality of inlet apertures 211 around the umbrella stick installation hole 25. The reverse umbrella face 502 is located on a lower surface of the valve seat 2 to cover the inlet apertures 211. When the support 61 is moved downward to pull the water capsule 5, the interior air pressure of the water capsule 5 lowers and the water pushes the reverse umbrella face 520 to enter the water capsule 5. On the contrary, when the support 61 is moved upward to compress the water capsule 5, the interior air pressure of the water capsule 5 rises and the reverse umbrella face 520 is pressed onto the valve seat 2 to close the inlet hole 21.

Figure 11:
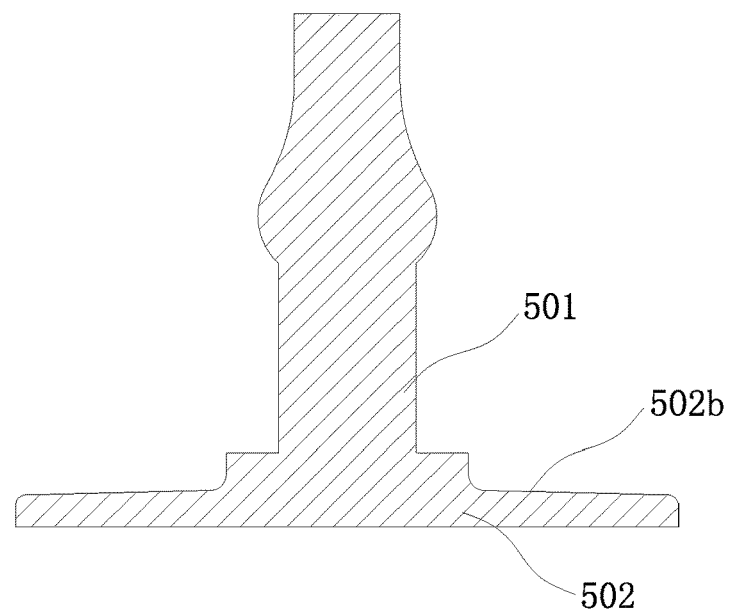
FIG. 11 is a sectional view showing the umbrella-shaped valve according to the preferred embodiment of the present invention.

As shown in FIG. 12, an inner surface of the reverse umbrella face 502 is a bowl-shaped surface 502a facing the umbrella stick 501. Because the elasticity of the bowl-shaped surface 502a is great, its airtight property is better. But, the bowl-shaped surface 502a may accumulate foreign objects easily, which results in bad airtightness. As shown in FIG. 11, an inner surface of the reverse umbrella face 502, close to the umbrella stick 501, is an inclined surface 502b which is inclined slightly. Although the airtightness of this configuration is slightly inferior to the aforesaid, the airtightness is enough for the micro water pump and won't accumulate foreign objects. Therefore, its airtightness is also good.

In this embodiment, the outlet hole 22 is centralized inside the valve seat 2. The one-way valve used for the outlet hole 22 preferably adopts a diaphragm unit 60. As shown in FIG. 10 and FIG. 13, the diaphragm unit 60 comprises a central post 601 and at least two diaphragms 60 extending outward and radially. In this embodiment, the number of the diaphragms 60 is three. The inner annular outlet passage 24 is formed with a central hole 241 for insertion of the central post 601. The outlet hole 22 is disposed around the central hole 241. Each diaphragm 602 corresponds to each outlet hole 22. The diaphragm unit 60 is formed with a positioning rib 603 disposed between every two of the diaphragms 602. The inner annular outlet passage 24 is formed with a pair of stop boards 242 corresponding to the positioning rib 603. The positioning rib 603 is located between the pair of stop boards 242. An outer end of the positioning rib 603 is formed with a positioning protrusion 604. The inner annular outlet passage 24 is formed with a positioning hole 243 corresponding to the positioning protrusion 604. The positioning protrusion 604 is inserted in the positioning hole 243. The stop boards 242 and the positioning hole 243 provide a dual-limit function, preventing deformation and movement of the positioning rib 603 so as to prevent displacement of the diaphragms 602 and to improve precision of discharge. The diaphragm unit 60 is formed with a recess 605 at the junction of each diaphragm 602 and the central post 601. The recess 605 increases the flexibility of the diaphragm 602, such that the diaphragm 602 can be opened or closed more easily. When the support 61 is moved upward to compress the water capsule 5, the water of the water capsule 5 will flow to the outlet hole 22 to push the diaphragm 602 away for water discharge. On the contrary, when the support 61 is moved downward to pull the water capsule 5, the interior air pressure of the water capsule 5 lowers and the diaphragm 602 is pressed onto the valve seat 2 to close the water outlet 22.

This embodiment enables the motor 9 to pump constant water under different volumes and back pressures, and cooperates with the photoelectric switch 10 to detect the revolution of the motor 9. The exterior motor controller can control the revolution of the motor 6 precisely so as to control the water outflow precisely. For the micro water pump that is small in size, the eccentric wheel 8 is directly connected with the motor 9, without additional transmission members.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A micro water pump for controlling flow, comprising an upper cover, a valve seat, a water capsule seat, a base casing, a water capsule, a crank lever, a drive shaft, an eccentric wheel, a motor, a photoelectric switch, and an output circuit board;

the motor and the photoelectric switch being installed on the base casing, the motor comprising a motor shaft, the motor shaft being inserted into the base casing and directly connected with the eccentric wheel in the base casing, the motor shaft and the eccentric wheel constituting a transmission member, the transmission member being radially provided with a photoelectric shelter corresponding to the photoelectric switch, the photoelectric shelter cooperating with the photoelectric switch for detecting a revolution of the motor, the photoelectric switch being electrically connected with the output circuit board, the output circuit board being electrically connected with an external motor controller and transmitting information of the revolution of the motor to the exterior motor controller;

the eccentric wheel being formed with an oblique eccentric hole, one end of the drive shaft being obliquely inserted in the eccentric hole, another end of the eccentric wheel being connected with the crank lever, an upper end of the crank lever being provided with at least two supports extending outward, the crank lever swinging to bring the supports to compress and swing repeatedly;

the water capsule seat being sealedly installed on the base casing, the water capsule seat being formed with at least two installation holes corresponding to the supports, each installation hole being sealedly installed with the water capsule, an upper portion of the water capsule being open, a lower portion of the water capsule being installed on a corresponding one of the supports, the supports bringing the water capsule to compress and swing repeatedly;

the valve seat being sealedly installed on the water capsule seat, the valve seat being formed with an inlet hole and an outlet hole corresponding to the water capsule, the inlet hole and the outlet hole being provided with one-way valves which are opened in different directions;

the upper cover being sealedly installed on the valve seat, the upper cover being formed with a water outlet and a water inlet, the water inlet communicating with the inlet hole, the water outlet communicating with the outlet hole, wherein an upper surface of the valve seat is formed with an outer annular inlet passage and an inner annular outlet passage, the outer annular inlet passage and the inner annular outlet passage are separated from each other, the inlet hole is disposed in the outer annular inlet passage, and the outlet hole is disposed in the inner annular outlet passage;

wherein the one-way valve used for the outlet hole is a diaphragm unit, the diaphragm unit comprises a central post and at least two diaphragms extending outward and radially, the inner annular outlet passage is formed with a central hole for insertion of the central post, the outlet hole is disposed around the central hole, and each diaphragm corresponds to the outlet hole; and wherein the diaphragm unit is formed with a positioning rib disposed between the diaphragms, the inner annular outlet passage is formed with a pair of stop boards corresponding to the positioning rib, the positioning rib is located between the pair of stop boards, an outer end of the positioning rib is formed with a positioning protrusion, the inner annular outlet passage is formed with a positioning hole corresponding to the positioning protrusion, the positioning protrusion is inserted in the positioning hole, the stop boards and the positioning hole are adapted to limit movement of the positioning rib, and the diaphragm unit is formed with a recess at a junction of each diaphragm and the central post.

2. The micro water pump for controlling flow as claimed in claim 1, wherein the one-way valves used for the inlet hole are umbrella-shaped valves, each umbrella-shaped valve includes an umbrella stick and a reverse umbrella face, the valve seat is formed with an umbrella stick installation hole, the umbrella stick is inserted and installed in the umbrella stick installation hole, the inlet hole is composed of a plurality of inlet apertures around the umbrella stick installation hole, and the reverse umbrella face is located on a lower surface of the valve seat to cover the inlet apertures.

3. The micro water pump for controlling flow as claimed in claim 2, wherein an inner surface of the reverse umbrella face is a bowl-shaped surface facing the umbrella stick.

4. The micro water pump for controlling flow as claimed in claim 1, wherein the water capsule includes a capsule body at the upper portion thereof and an installation post at the lower portion thereof, the capsule body has a bowl shape, an upper end of the capsule body is formed with an installation face around the capsule body, the installation face has a thickness greater than that of a bowl wall of the capsule body, an outer side of the installation face is formed with positioning protrusions, the water capsule seat is formed with a trough face at the installation holes and positioning notches around the trough face, the positioning protrusions are engaged in the positioning notches, the installation face is sealedly disposed on the trough face through the valve seat, the installation post is formed with a neck, each support is formed with a post hole, the neck is inserted into the post hole so as to assemble the installation post on the support, and a junction of the capsule body and the installation post is formed with a compression portion having a diameter greater than that of the installation post.

5. The micro water pump for controlling flow as claimed in claim 1, wherein the crank lever has a flat transition section between the supports and a reinforcement area at a junction of the supports and an upper end of the crank lever, and the supports and the crank lever are arranged at an acute angle.

6. The micro water pump for controlling flow as claimed in claim 1, wherein the upper cover, the valve seat, the water capsule seat, and the base casing are formed with grooves on respective outer walls thereof to receive engaging springs, and upper and lower ends of the engaging springs are pressed against the upper cover and the base casing respectively, such that the upper cover, the valve seat, the water capsule seat, and the base casing are secured together.

7. The micro water pump for controlling flow as claimed in claim 1, wherein a wear plate is provided between the eccentric wheel and the base casing, the base casing is formed with a raised platform, and the wear plate is installed on the raised platform.

8. The micro water pump for controlling flow as claimed in claim 1, wherein the photoelectric shelter is located on the motor shaft.

9. The micro water pump for controlling flow as claimed in claim 1, wherein the photoelectric shelter is located on the eccentric wheel.

* * * * *